UNITED STATES PATENT OFFICE.

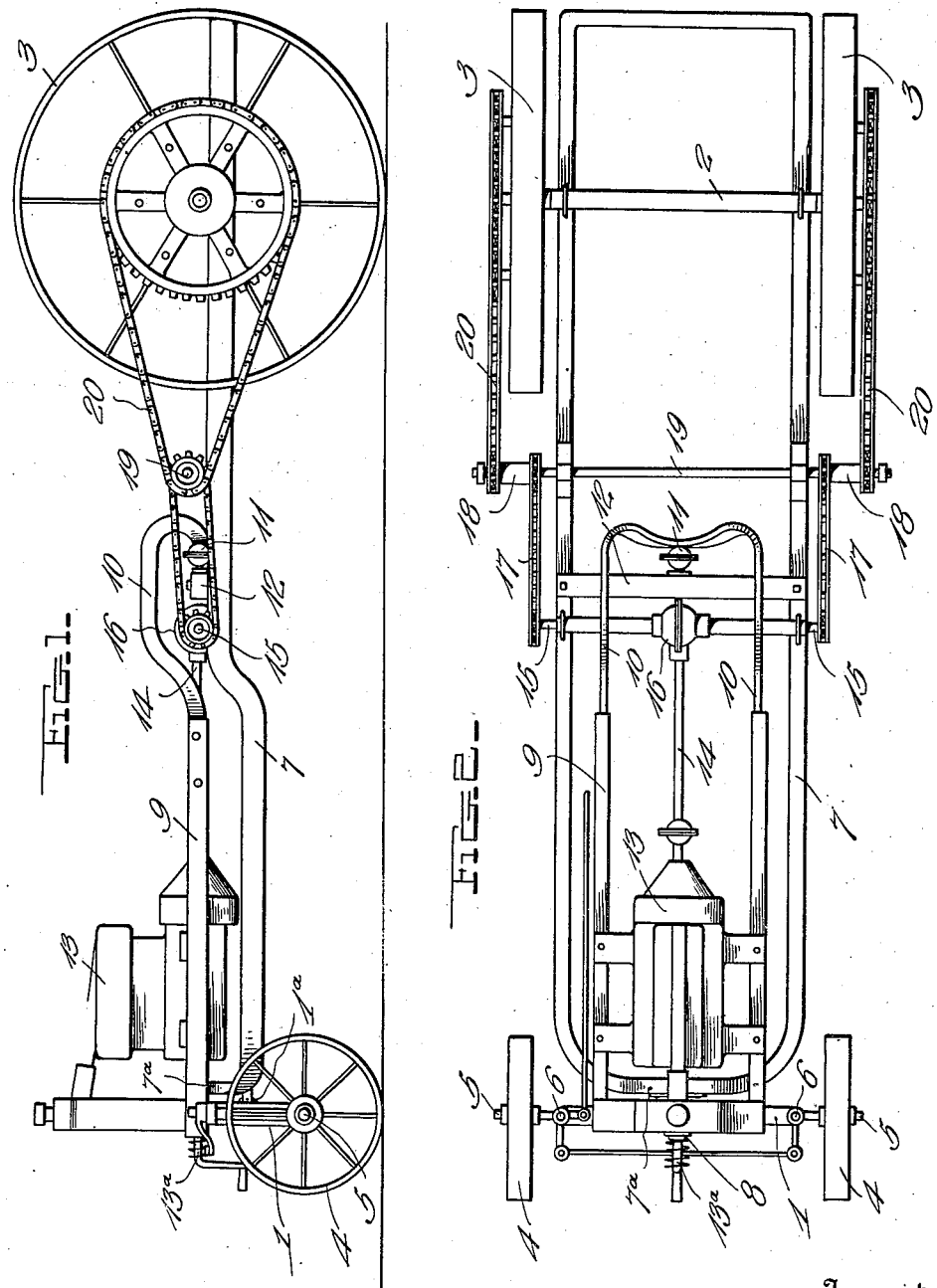

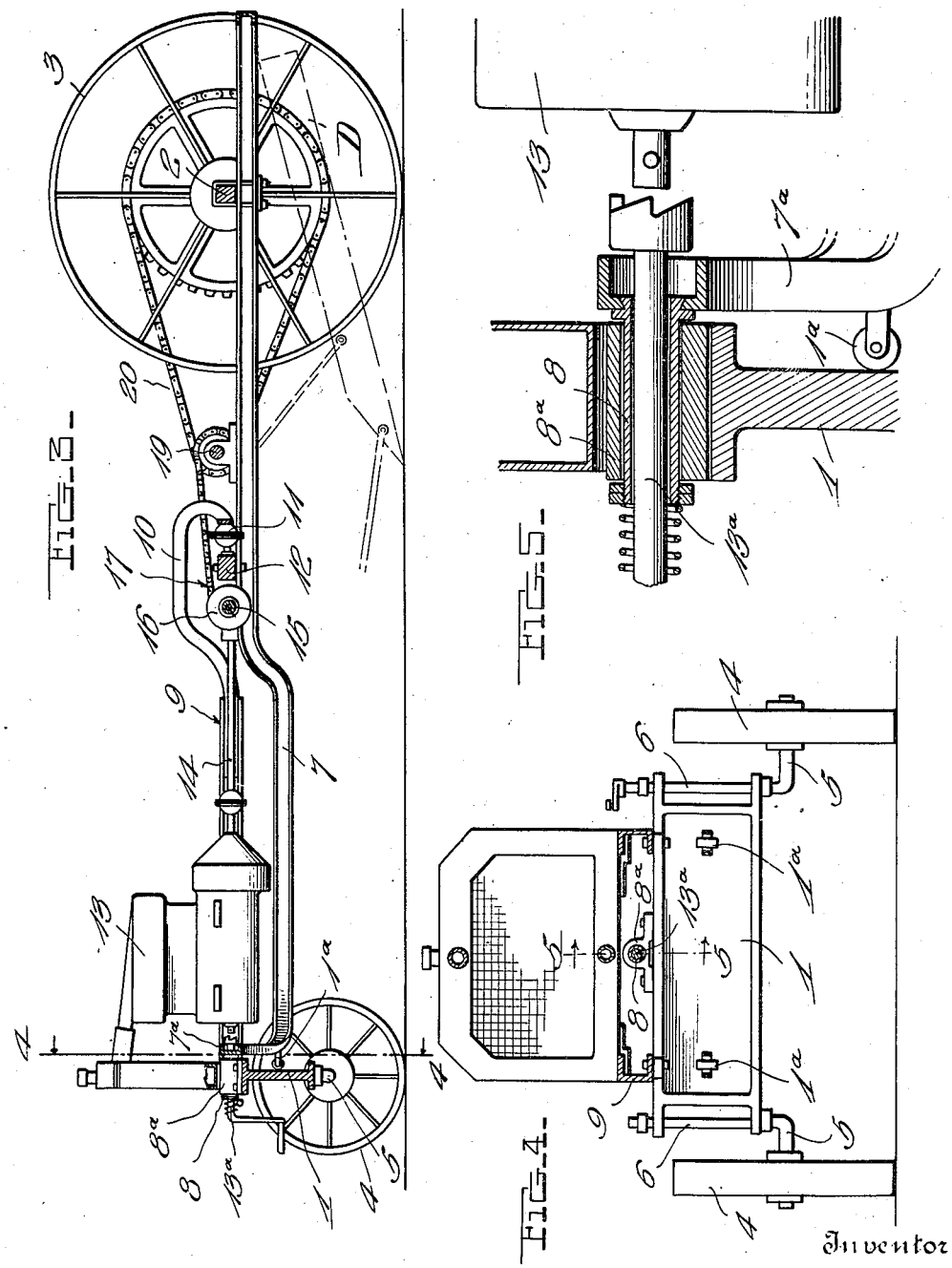

NICHOLAS NELSON, OF CARIBOU, MAINE.

TRACTOR.

1,305,231.  Specification of Letters Patent.  Patented May 27, 1919.

Application filed November 15, 1917. Serial No. 202,194.

*To all whom it may concern:*

Be it known that I, NICHOLAS NELSON, a citizen of the United States, residing at Caribou, in the county of Aroostook and State of Maine, have invented certain new and useful Improvements in Tractors; and I do declare the following to be a full, clear, and exact description of the invention, such as will enable others skilled in the art to which it appertains to make and use the same.

My invention has for its principal object to provide a comparatively simple and inexpensive, yet a highly efficient and durable tractor whose frame is so constructed that it need not be distorted by twisting as the wheels of the machine travel over rough fields and other uneven surfaces; and with this general object in view, the invention resides in the novel features of construction and unique combinations of parts to be hereinafter fully described and claimed, the descriptive matter being supplemented by the accompanying drawings which form a part of this specification and in which:—

Figure 1 is a side elevation;

Fig. 2 is a top plan view;

Fig. 3 is a central vertical longitudinal section;

Fig. 4 is a vertical transverse section on the plane of the line 4—4 of Fig. 3; and Fig. 5 is an enlarged longitudinal section on the plane of the line 5—5 of Fig. 4.

In the drawings above briefly described, the numerals 1 and 2 designate respectively the front and rear axles of the machine, the rear axle having a pair of driving wheels 3 whereas dirigible wheels 4 are provided at the ends of the front axle 1, said wheels 4 being preferably mounted on spindles 5 which extend from the lower ends of vertical rock shafts 6, any suitable mechanism being provided for so rocking said shafts as to turn the wheels 4 in the direction in which the machine is to be driven.

A suitably constructed main frame 7 extends forwardly from the rear axle 2 and is turned upwardly at 7ª and provided with a tubular spindle 8 extending across the front axle 1 and received in a suitable bearing 8ª which is secured to said axle. An auxiliary frame 9 is secured to the front axle 1 and overlies the frame 7 in spaced relation thereto; the side bars of said auxiliary frame being arched at their rear ends as indicated at 10 and connected by means of a suitable universal joint or other swivel 11 with a transverse bar 12 of the frame 7.

By the above described arrangement of frames and swivel connection between them, the front and rear axles are permitted to tilt independently as the machine passes over the ground, the spindle 8 and joint 11 then coming into play to permit relative movement of the two frames 7 and 9 without distorting them in any manner.

A gasolene engine 13 is mounted upon the front end of the auxiliary frame 9 and a propeller shaft 14 is driven by said engine, said shaft driving a pair of transverse shafts 15, by means of suitable differential gearing located in the housing 16, said housing and the shafts 15 being mounted on frame 7 in advance of the transverse bar 12 above described.

The shafts 15 may be connected directly to the traction wheels 3, but the drive shown most clearly in Fig. 2 is preferably employed. Chains 17 are shown extending rearwardly from the shafts 15 for driving a pair of sleeves 18 mounted on a transverse shaft 19 in rear of the shafts 15, and other chains 20 are driven by said sleeve for driving the traction wheels 3.

A tractor constructed as or substantially as shown and described, may be used for numerous purposes, the application of a potato digger D being illustrated in the drawings in dotted lines. This digger is shown located below the main frame 7 and between the traction wheels 3, but it will be obvious that it could well be positioned wherever required. Regardless of its location, however, suitable driving means (not shown) will be employed for operating the moving parts of the digging and conveying mechanism from the engine or certain of the parts driven by the latter.

The engine 13 is provided with the usual starting crank and the spindle 8 is so located as to permit it to receive the shaft 13ª of said crank as featured in Fig. 5. The spindle 8 as well as the joint 11 are alined with the propeller shaft 14 and the differential gearing, so that relative movement of the two frames will not in any manner interfere with these parts. As the frames in question move in respect to each other, rollers or other suitable devices 1ª which are carried by frame 7, travel upon axle 1 to at all times brace the latter against possible rearward tilting.

From the foregoing, taken in connection with the accompanying drawings, it will be obvious that although my invention is of extremely simple and inexpensive nature, it will be highly efficient and durable, particular emphasis being laid upon the provision of the main and auxiliary frames and the relation of the swivel connections between them. The relation of the differential gearing with these connections is also of great importance, since the continuity of drive is not affected by relative turning of the two frames, when such an arrangement is employed.

Since probably the best results are obtained from the several specific features shown and described, these features constitute the preferred embodiment of the tractor, but I wish it understood that within the scope of the invention as claimed, numerous minor changes may well be made.

I claim:

1. A tractor comprising a main horizontal frame wheel-supported at its rear end, a front wheeled-axle, a central swivel connection between the front end of said frame and said axle, an auxiliary frame secured to and extending rearwardly from said front axle to substantially the center of said main frame, a central swivel connection between the rear end of said auxiliary frame and said main frame, a prime mover on said auxiliary frame, and driving connections between said prime mover and the rear wheels, said prime mover being mounted on the front end of said auxiliary frame and the latter extending rearwardly from said prime mover a considerable distance, whereby the greater part of the prime mover's weight is supported by said front axle and only a small portion of said weight by the swivel connections.

2. A tractor comprising a main horizontal frame wheel-supported at its rear end and having its front end turned upwardly, a transverse jack shaft mounted on said frame substantially midway between its ends for driving the wheels thereof, an auxiliary horizontal frame extending over substantially the front half of said main frame, a swivel connection between the rear end of said auxiliary frame and said main frame located centrally behind said jack shaft, a front-wheeled axle to which the front end of said auxiliary frame is secured, a central swivel connection between said upturned end of the main frame and said front axle, a prime mover mounted on the front end of said auxiliary frame, and a central drive shaft leading rearwardly from said prime mover for driving said jack shaft.

3. A tractor comprising a main frame wheel supported at its rear end and having a transverse arch at its front end, a front wheeled axle swiveled centrally to the upper portion of said arch, a pair of shoes on said arch contacting with the rear side of said axle to brace the latter and at the same time to permit relative turning of said axle and arch, and an auxiliary engine-carrying frame secured to and extending rearwardly from said front axle, the rear end of said auxiliary frame being centrally swiveled to said main frame.

In testimony whereof I have hereunto set my hand in the presence of two subscribing witnesses.

NICHOLAS NELSON.

Witnesses:
J. L. JOHNSON,
A. L. CARLSON.